United States Patent
Weaver et al.

(10) Patent No.: US 10,634,274 B2
(45) Date of Patent: Apr. 28, 2020

(54) PIPE TRANSPORTER TRACTION WHEEL

(71) Applicant: TruGrit Traction, Inc., Winter Park, FL (US)

(72) Inventors: Mark V. Weaver, Landrum, SC (US); Todd C. Weaver, Winter Park, FL (US); Thomas P. Rebozo, Jr., Carlsbad, CA (US)

(73) Assignee: TRUGRIT TRACTION, INC., Winter Park, FL (US)

( * ) Notice: Subject to any disclaimer, the term of this patent is extended or adjusted under 35 U.S.C. 154(b) by 244 days.

(21) Appl. No.: 15/814,613

(22) Filed: Nov. 16, 2017

(65) Prior Publication Data

US 2018/0208101 A1 Jul. 26, 2018

Related U.S. Application Data

(60) Provisional application No. 62/450,344, filed on Jan. 25, 2017.

(51) Int. Cl.
*F16L 55/28* (2006.01)
*A63C 17/22* (2006.01)

(52) U.S. Cl.
CPC ............ *F16L 55/28* (2013.01); *A63C 17/226* (2013.01)

(58) Field of Classification Search
CPC ...... A63C 17/22; A63C 17/223; A63C 17/226
See application file for complete search history.

(56) References Cited

U.S. PATENT DOCUMENTS

| 5,860,707 A * | 1/1999 | Keleny | A63C 17/223 |
| | | | 152/323 |
| 5,924,705 A * | 7/1999 | Kubelka | A63C 17/22 |
| | | | 280/11.19 |
| 5,979,993 A * | 11/1999 | Huang | B60C 5/001 |
| | | | 301/5.308 |
| 9,358,549 B2 * | 6/2016 | Kawamura | C04B 35/56 |
| 2006/0267397 A1 | 11/2006 | Possarnig et al. | |

(Continued)

FOREIGN PATENT DOCUMENTS

DE 9114509 U1 2/1992
DE 10 2004 032678 A1 1/2006

(Continued)

OTHER PUBLICATIONS

Extended European Search Report for EP 17208117.6, dated Jun. 5, 2018.

(Continued)

*Primary Examiner* — Jason R Bellinger
(74) *Attorney, Agent, or Firm* — JK Intellectual Property Law, PA

(57) ABSTRACT

A pipe transporter traction wheel suitable for mounting on a pipe transporter travelable along an interior surface of a pipe may include a tractor portion configured to be attached to a pipe transporter, the tractor portion having a tractor surface configured to contact an interior surface of a pipe when the pipe transporter is driven in the pipe. The tractor portion may include a harder granular material and a softer matrix material embedding the granular material. The wheel may include a hub and/or a mounting interface. A kit may be provided including one or two adapters and a wheel.

19 Claims, 12 Drawing Sheets

(56) References Cited

U.S. PATENT DOCUMENTS

2008/0303337 A1* 12/2008 Krantz .................. B60B 23/00
                                                                         301/5.306
2010/0299869 A1   12/2010  Von Bordelius
2015/0298503 A1   10/2015  Pomp

FOREIGN PATENT DOCUMENTS

| EP | 3196048 | 7/2017 |
|---|---|---|
| GB | 2500815 A | 10/2013 |
| WO | WO 2015/090653 | 6/2015 |

OTHER PUBLICATIONS

Extended European Search Report for EP 17208119.2, dated Jun. 5, 2018.

* cited by examiner

PIPE TRANSPORTER TRACTION WHEEL

CROSS REFERENCE TO RELATED APPLICATION

This application claims filing benefit of U.S. Provisional Patent Application Ser. No. 62/450,344, having a filing date of Jan. 25, 2017, which is incorporated herein by reference in its entirety.

TECHNICAL FIELD

The present disclosure relates generally to pipe inspection transporter apparatuses, and more particularly, to a pipe transporter traction wheel which is suitable for mounting on a pipe transporter, has superior traction capability and a prolonged tread life and prevents or minimizes damage or wear to the interior surface of a pipe in which the pipe transporter is deployed.

BACKGROUND

Wastewater (also known as storm water and sewer) pipelines are an essential part of the infrastructure of modern populated areas. These pipelines must be maintained, and this requires periodic inspection of every linear foot of the wastewater pipeline per federal or regulatory mandates. For example, conventional sewerage systems may be periodically inspected for the presence of cracks and other anomalies by the deployment of waterproof video equipment which is mounted on a mechanical device. The device can be remotely operated in a motorized fashion to traverse the interior of the wastewater pipe, or may be alternatively towed on a suitable carriage.

Remotely-operated inspection apparatuses, commonly known as "transporters", may be used for pipeline inspections. Transporters may be particularly useful in the inspection of smaller diameter pipe which is too small for direct inspection. Transporters may carry video cameras or sonar, radar or other sensing equipment along the interior of the pipe to allow personnel to view cracks and other imperfections in the pipe. Wheeled transporters are also used in the relining of pipes, where the transporter carries ultraviolet lights designed to "cure" or harden plastic/polymer lining (sleeve) material after inflation inside the pipe. After relining occurs, the openings of lateral pipes are occluded by the new lining sleeve. A third type of wheeled transporter, carrying rotary cutting equipment, is used to locate and reinstate the lateral openings to the relined mainline.

Many transporters may utilize multiple drive axles fitted with wheels which are designed to maximize traction of the wheels against the interior surface of the pipe. The wheels may include solid rubber or polyurethane traction (tread) surfaces, which are advantageous in that they cause negligible damage to the interior of the pipe. However, rubber and polyethylene traction surfaces do not provide sufficient traction to allow operation of transporters beyond a distance defined by the forces acting on the transporter, greases and other slick coatings common in active wastewater pipes, and more particularly the friction coefficients at the tire-to-pipe interfaces. Alternatively, the transporter wheels may be constructed by bonding carbide grit to the tread surface of a hub made of metal or other material. Carbide grit traction sections may provide superior traction to allow further penetration of the transporter through a section of pipe. However, carbide grit traction sections may have the attendant disadvantage of causing wear relatively quickly to the interior surface of the pipe. Moreover, conventional carbide grit transporter wheels typically have a shorter useful life.

Accordingly, there is an established need for a pipe transporter traction wheel which is suitable for mounting on a pipe transporter, has superior traction capability, has a prolonged tread life, prevents or minimizes damage or wear to the interior surface of a pipe in which the pipe transporter is deployed, and/or addresses other needs.

SUMMARY

The present disclosure is directed to a pipe transporter traction wheel which is suitable for mounting on a pipe transporter, has superior traction capability, has a prolonged tread life, and/or prevents or minimizes damage or wear to the interior surface of a pipe in which the pipe transporter is deployed. In some embodiments, the pipe transporter traction wheel may include a tractor portion ("tractor portion" also called herein "traction portion") and one or more tractor sections ("tractor sections" also called herein "traction section") on the tractor portion. For instance, a plurality of tractor sections may be discretely arranged or spaced apart from one another around the circumference of the tractor portion. Gaps may separate the tractor sections from each other. The tractor portion may be fabricated of granules or particles of a harder, granular material such as carbide grit and a softer, matrix material encasing or embedding the granules or particles of the granular material. The harder, granular material provides traction of the wheel against the interior surface of the pipe, whereas the softer, matrix material protects the pipe. In some embodiments, the harder, granular material may include carbide grit, steel wool, various aggregates (e.g. crushed stone such as granite or quartz), diamond or other variations of carbon, and the like. The softer, matrix material may include a thermoplastic elastomer, rubber, open cast urethane, epoxy, curable gel, putty and/or any other substance that can position or hold the harder, granular material in place in the tractor portion.

According to one embodiment, a pipe transporter traction wheel which is suitable for mounting on a pipe transporter, has superior traction capability, has a prolonged tread life, and/or prevents or minimizes damage or wear to the interior surface of a pipe in which the pipe transporter is deployed includes, for example, a tractor portion configured to contact an interior surface of a pipe along which the pipe transporter can travel, the tractor portion including a harder, granular material and a softer, matrix material encasing or embedding the harder, granular material.

In a second aspect, the harder, granular material may include carbide grit, steel wool, various aggregates such as crushed stone such as granite or quartz, diamond or other variations of carbon, silicates, and the like.

In another aspect, the softer, matrix material may include a thermoplastic elastomer, rubber, open cast urethane, epoxy, curable gel, putty and/or any other substance that can position or hold the harder, granular material in place in the tractor portion.

In yet another aspect, the tractor portion can include a plurality of tractor sections configured to contact the interior surface of the pipe, the plurality of tractor sections spaced apart from one another around a circumference of the tractor portion and separated by gaps. Alternatively, the tractor portion can comprise a single, continuous tractor surface ("tractor surface" also called herein "traction surface") arranged around a perimeter of the wheel and devoid of gaps.

In another aspect, the tractor portion may have a rear wheel surface and a front wheel surface, and the tractor sections and the gaps may extend from the rear wheel surface to the front wheel surface in an alternating pattern.

In another aspect, the pipe transporter traction wheel can further include a wheel axle interface or hub carrying the tractor portion, the hub configured to provide a mounting interface to a drive axle of the pipe transporter.

In another aspect, a central wheel opening may extend through the tractor portion to facilitate mounting the tractor portion on the hub.

In still another aspect, the hub may include a hub rim and a central hub opening extending through the hub rim to facilitate mounting of the tractor portion on the hub.

In another aspect, the wheel opening may have an interior wheel surface, and one or more wheel connecting portion skins may protrude from the interior wheel surface to interlock with respective one or more wheel connecting portions extending into the hub opening of the hub, forming, in part or in full, a mounting interface to the transporter.

In another aspect, the tractor portion may be molded onto the hub.

In another aspect, in-process molding injection points within the tractor portion may be located interstitially between adjacent tractor sections of the tractor portion to provide a denser distribution of the harder, granular material within the softer, matrix material of the traction sections.

In another aspect, the density of the harder, granular material may be lower at the tractor portion injection points than in the remaining portion of the tractor portion.

In another aspect, the pipe transporter traction wheel may not include a hub, i.e. the harder, granular material is encased within the softer, matrix material without the inclusion of a hub.

The aforementioned aspects of the pipe transporter traction wheel may be combined with one another in different embodiments of the disclosure. For instance, the tractor portion may be formed by a harder, granular material encased within a softer, matrix material, the wheel lacking a hub, and the tractor portion including a single, continuous tractor surface arranged around a perimeter of the wheel and devoid of gaps.

According to a second embodiment, a pipe transporter traction wheel which is suitable for mounting on a pipe transporter, has superior traction capability, has a prolonged tread life, and/or prevents or minimizes damage or wear to the interior surface of a pipe in which the pipe transporter is deployed includes, for example, a hub configured to provide a mounting interface to a drive axle of the pipe transporter, the hub including a hub rim and a plurality of counterbore openings extending through the hub rim, a tractor portion molded onto the hub and interlocking with the hub rim of the hub at the counterbore openings, the tractor portion including harder, granular material and a softer, matrix material encasing or embedding the harder, granular material, a plurality of tractor sections on the tractor portion, the plurality of tractor sections spaced discretely from one another around a circumference of the tractor portion, and a plurality of gaps separating the plurality of tractor sections from each other.

According to a third embodiment, a pipe transporter traction wheel which is suitable for mounting on a pipe transporter, has superior traction capability, has a prolonged tread life, and/or prevents or minimizes damage or wear to the interior surface of a pipe in which the pipe transporter is deployed includes, for example, a hub configured to provide a mounting interface to a drive axle of the pipe transporter, the hub including a hub rim, a plurality of counterbore openings extending through the hub rim and a plurality of front hub notches and a plurality of rear hub notches extending through the hub rim at the plurality of counterbore openings, respectively, a tractor portion molded onto the hub and interlocking with the hub rim of the hub at the counterbore openings, the tractor portion including harder, granular material and a softer, matrix material encasing or embedding the harder, granular material, a plurality of tractor sections on the tractor portion, the plurality of tractor sections spaced discretely around a circumference of the tractor portion, a plurality of gaps separating the plurality of tractor sections from each other.

According to a fourth embodiment, a pipe transporter traction wheel which is suitable for mounting on a pipe transporter, has superior traction capability, has a prolonged tread life, and/or prevents or minimizes damage or wear to the interior surface of a pipe in which the pipe transporter is deployed includes, for example, a hub configured to provide a mounting interface to a drive axle of the pipe transporter, the hub including a hub rim and a hub bonding surface on the hub rim, a tractor portion bonded to the hub bonding surface on the hub rim of the hub, the tractor portion including harder, granular material and a softer, matrix material encasing or embedding the harder, granular material, a plurality of tractor sections on the tractor portion, the plurality of tractor sections spaced apart from one another around a circumference of the tractor portion, and a plurality of gaps separating the plurality of tractor sections from each other.

According to certain aspects of the disclosure, a pipe transporter traction wheel suitable for mounting on a pipe transporter travelable along an interior surface of a pipe may include a tractor portion configured to be attached to a pipe transporter. The tractor portion may have a tractor surface configured to contact an interior surface of a pipe when the pipe transporter is driven in the pipe, the tractor portion including a granular material and a matrix material embedding the granular material, the granular material having a hardness higher than a hardness of the matrix material. Various options and modifications are possible.

According to certain other aspects of the disclosure, a pipe transporter traction wheel suitable for mounting on a pipe transporter travelable along an interior surface of a pipe may include a hub having an outer surface. A tractor portion may be bonded to the outer surface of the hub, the tractor portion having a tractor surface configured to contact an interior surface of a pipe when the pipe transporter is driven in the pipe. The tractor surface may extend around a circumference of the tractor portion, and the tractor portion may include a plurality of tractor sections spaced apart from one another around the circumference of the tractor portion and separated by gaps, each of the tractor sections including a part of the tractor surface. Again, various options and modifications are possible.

According to certain other aspects of the disclosure, a pipe transporter traction wheel suitable for mounting on a pipe transporter travelable along an interior surface of a pipe may include a hub having an irregular exterior shape. A tractor portion may be overmolded onto the hub so that overmolded portions of the tractor portion interlock with the irregular exterior shape to help secure the tractor portion to the hub, the tractor portion having a tractor surface configured to contact an interior surface of a pipe when the pipe transporter is driven in the pipe. Again, various options and modifications are possible.

According to certain other aspects of the disclosure, a pipe transporter traction wheel suitable for mounting on a pipe transporter travelable along an interior surface of a pipe may include a tractor portion configured to be attached to a pipe transporter and a defining a central axis. A tractor surface on the tractor portion may be configured to contact an interior surface of a pipe when the pipe transporter is driven in the pipe, the tractor surface extending around a circumference of the tractor portion around the central axis, and the tractor portion including a plurality of tractor sections spaced apart from one another around the circumference of the tractor portion and separated by first gaps, each of the tractor sections including a part of the tractor surface. A mounting interface may be located generally around the central axis of the tractor portion, the mounting interface being configured for attachment of the pipe transporter traction wheel to the pipe transporter, the mounting interface including an opening between a rear wheel surface and a front wheel surface of the tractor portion, the mounting interface further including a plurality of lobes, the lobes extending radially inward toward the central axis and being separated by second gaps. Again, various options and modifications are possible.

According to certain other aspects of the disclosure, a kit for a pipe transporter traction wheel suitable for mounting on an axle of a pipe transporter travelable along an interior surface of a pipe. The kit may include a pipe transporter traction wheel including a tractor portion defining a central axis and having a tractor surface configured to contact an interior surface of a pipe when the pipe transporter is driven in the pipe; and a mounting interface located generally around the central axis of the tractor portion, the mounting interface being configured for attachment of the pipe transporter traction wheel to the axle, the mounting interface including an opening between a rear wheel surface and a front wheel surface of the tractor portion, the mounting interface further including a plurality of lobes, the lobes extending radially inward toward the central axis and being separated by gaps. The kit may also include an adapter configured for cooperatively assisting in attachment of the pipe transporter traction wheel to the axle. Various options and modifications are possible.

These and other objects, features, and advantages of the disclosed embodiments will become more readily apparent from the attached drawings and the detailed description of the preferred embodiments, which follow.

BRIEF DESCRIPTION OF THE DRAWINGS

The preferred embodiments of the disclosure will hereinafter be described in conjunction with the appended drawings provided to illustrate and not to limit the disclosure, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the disclosure as oriented in FIG.

1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward a pipe transporter traction wheel which is suitable for mounting on a pipe transporter, has superior traction capability, has a prolonged tread life, and/or prevents or minimizes damage or wear to the interior surface of a pipe in which the pipe transporter is deployed, and/or provides other benefits.

Figure 1:
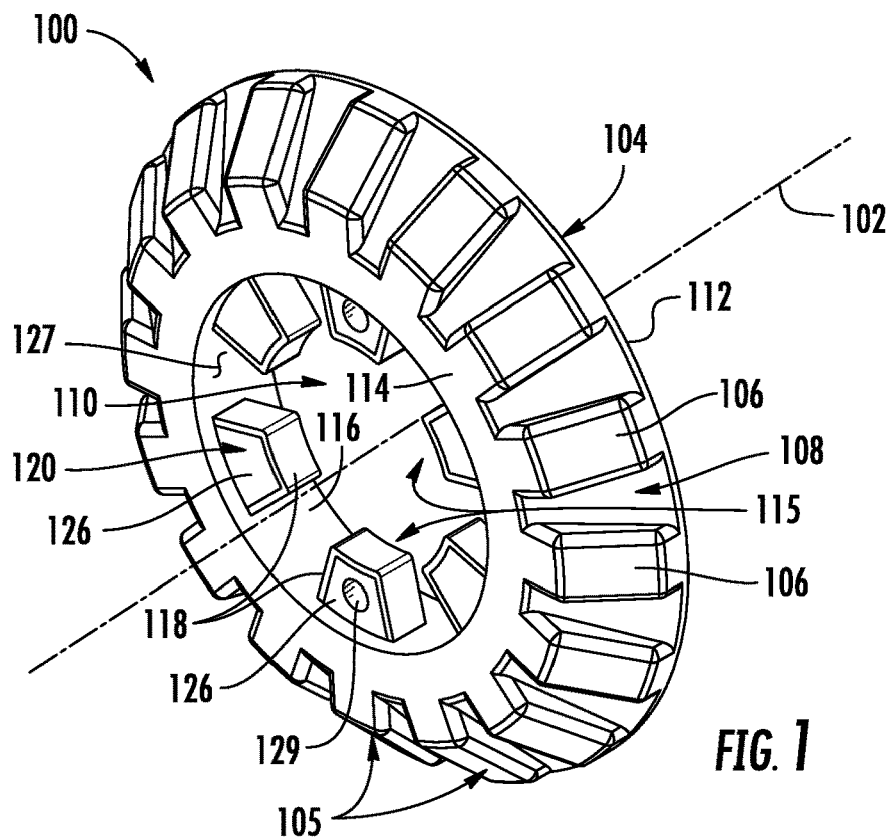
FIG. 1 presents a top front perspective view showing a first embodiment of the pipe transporter traction wheel of the present disclosure.
Figure 2:
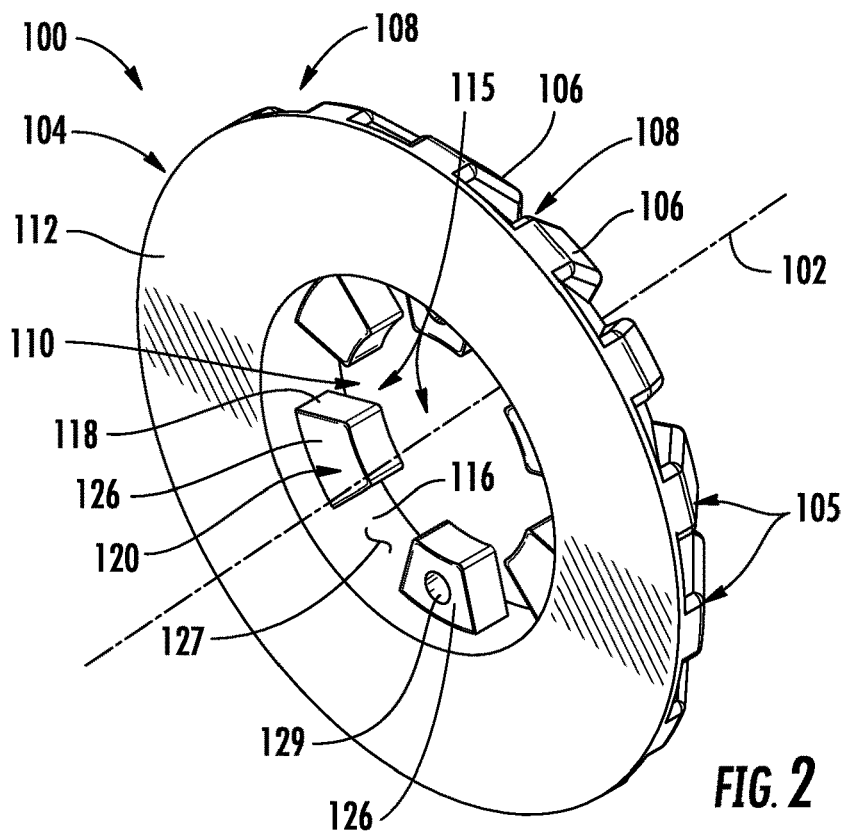
FIG. 2 presents a top rear perspective view of the first embodiment of the pipe transporter traction wheel of the present disclosure.
Figure 3:
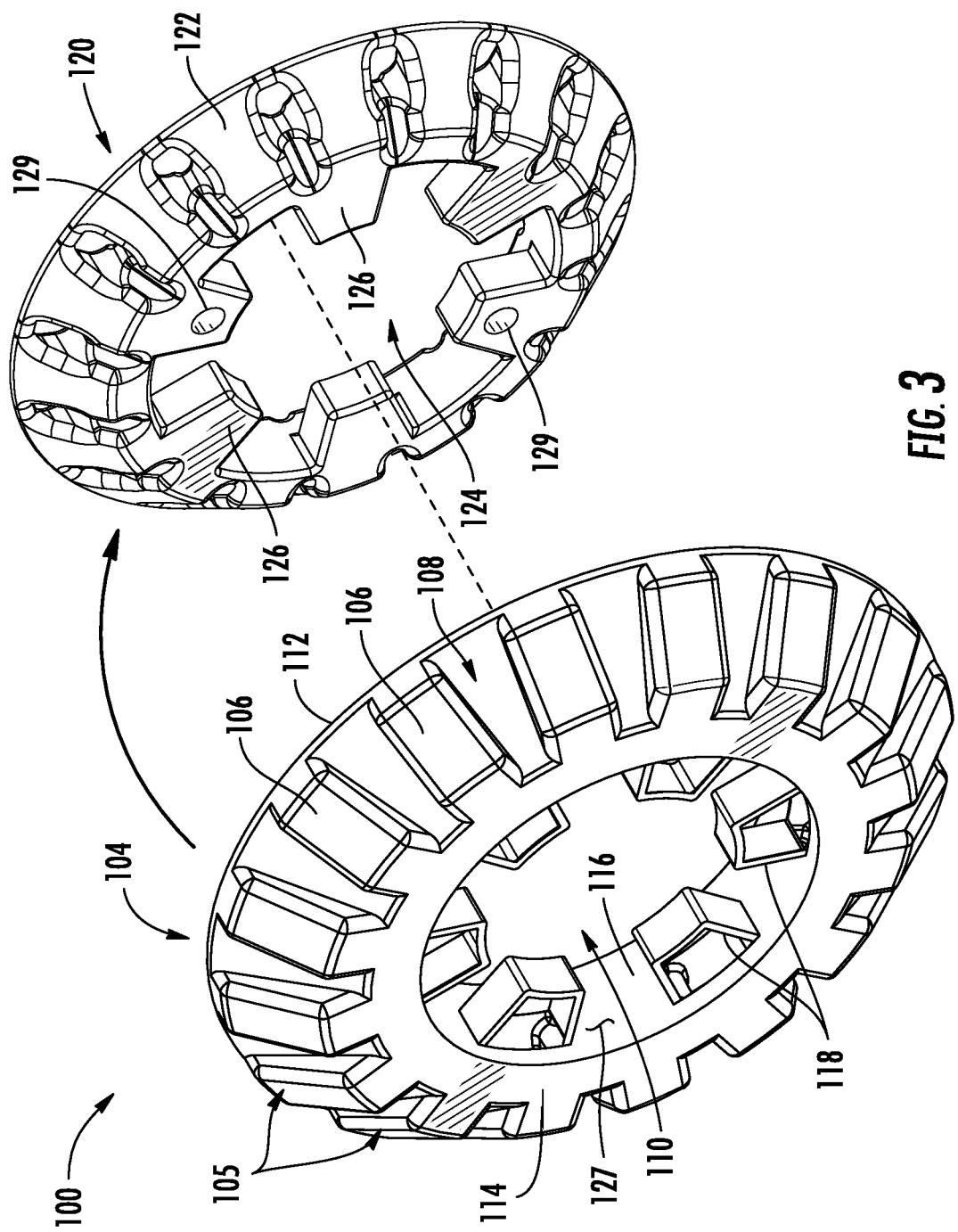
FIG. 3 presents an exploded top front perspective view illustrating the relative placement of the tractor portion on the hub of the first embodiment of the pipe transporter traction wheel of the present disclosure.
Figure 4:
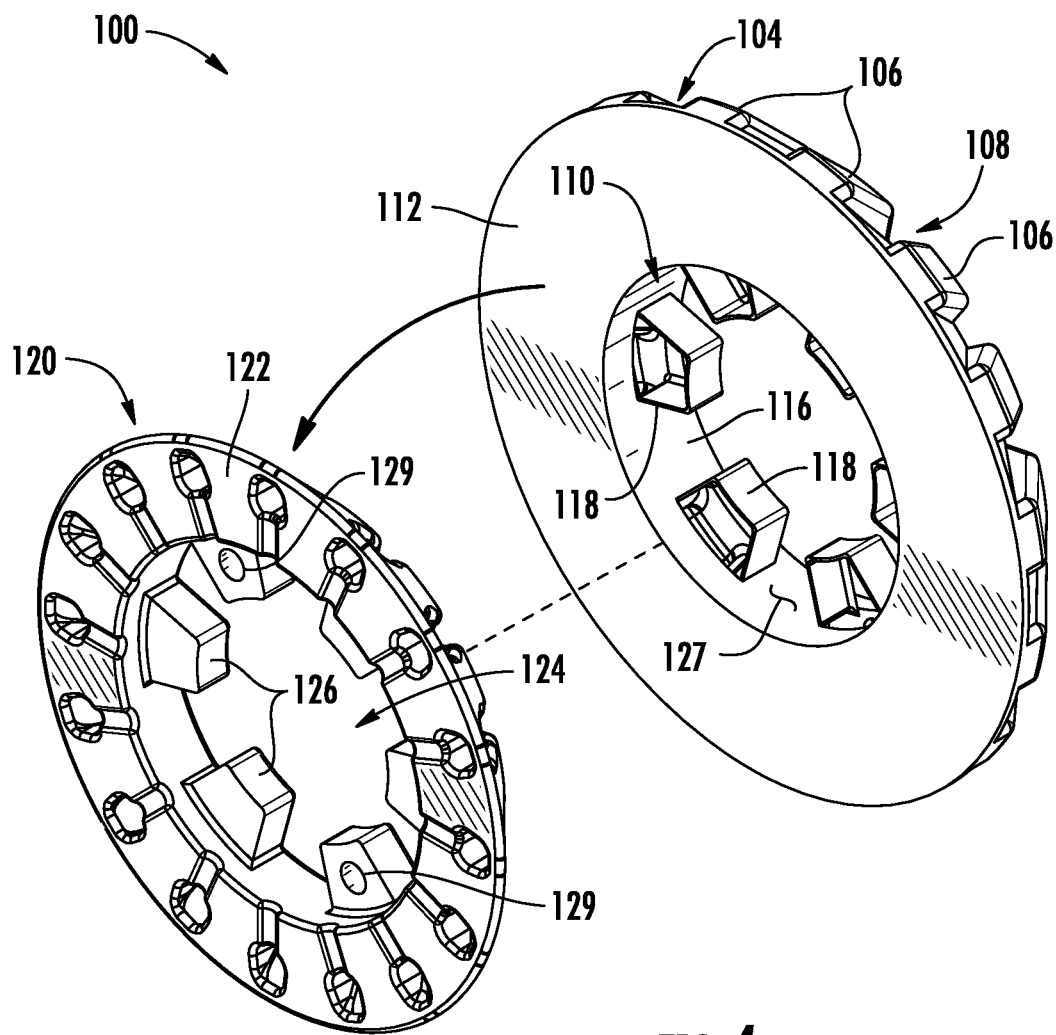
FIG. 4 presents an exploded rear perspective view illustrating the relative placement of the tractor portion on the hub of the first embodiment of the pipe transporter traction wheel of the present disclosure.
Figure 7:
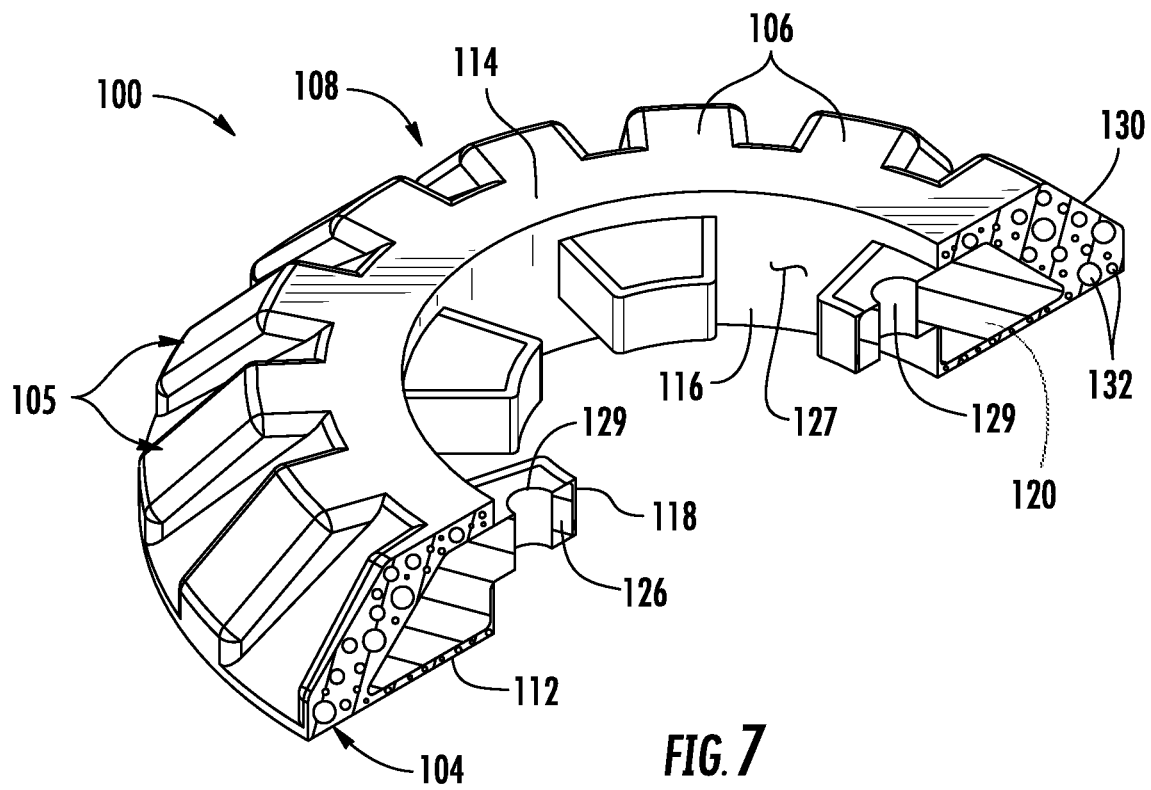
FIG. 7 presents another cross-sectional perspective view of the first embodiment of the pipe transporter traction wheel of the present disclosure.
Figure 8:
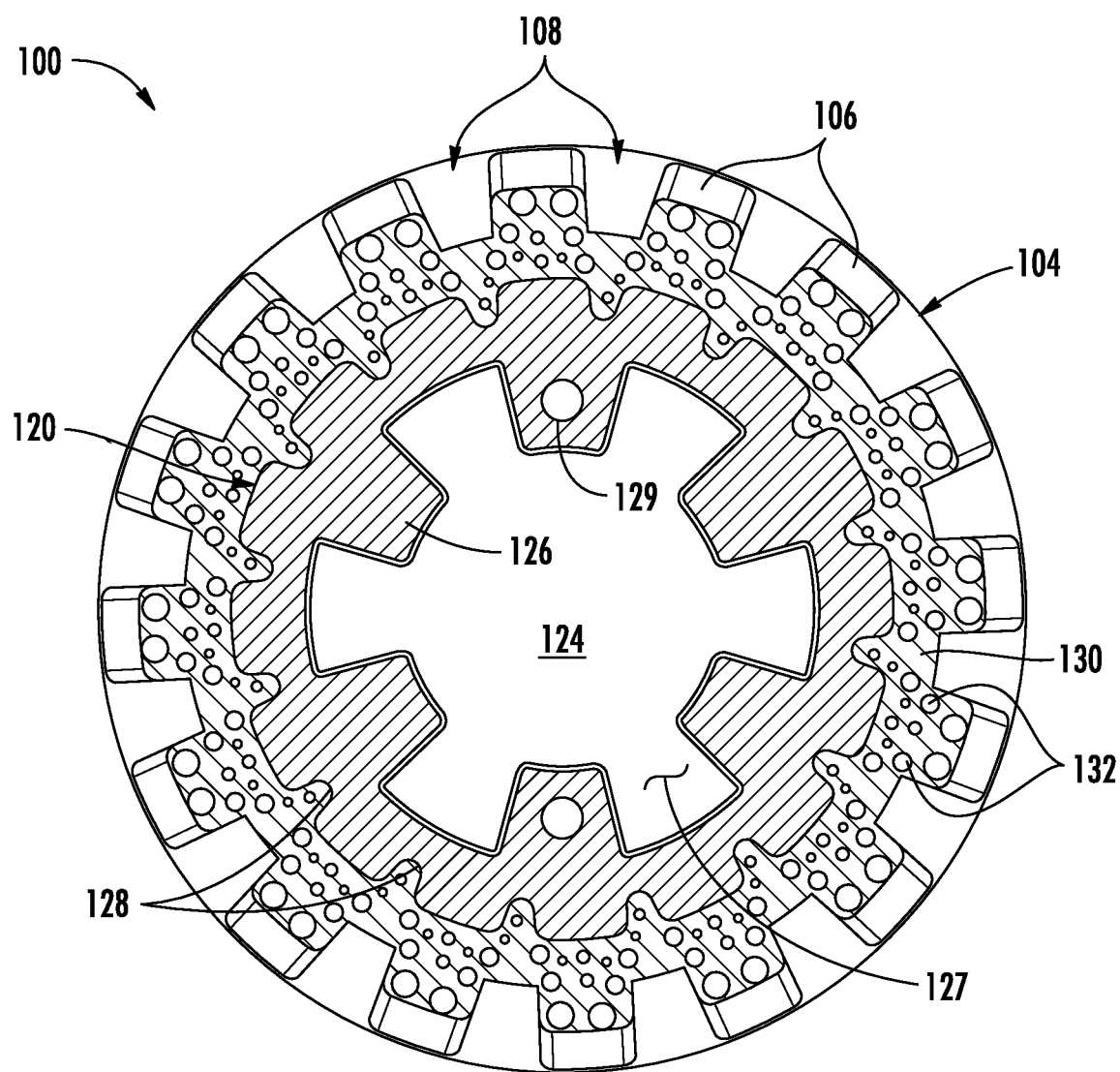
FIG. 8 presents a cross-sectional front elevation view of the first embodiment of the pipe transporter traction wheel of the present disclosure.
Figure 9:
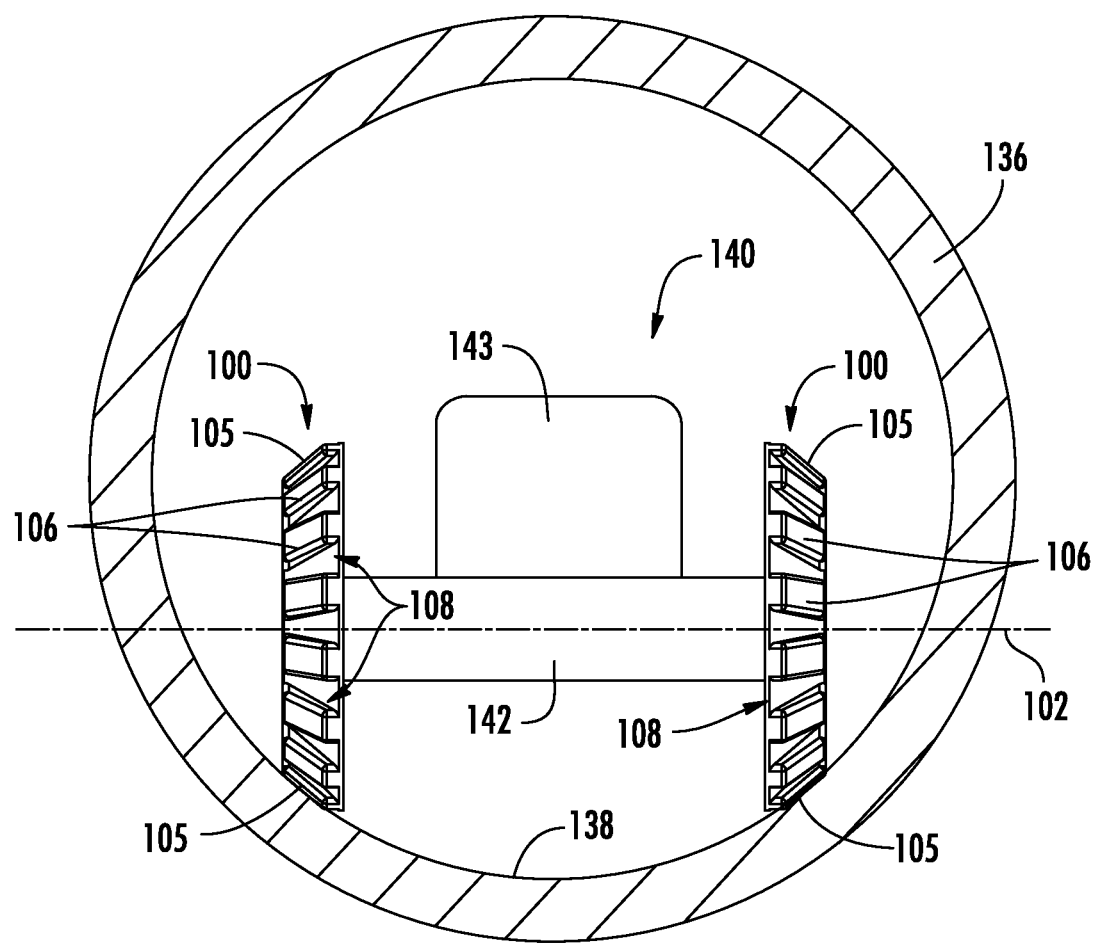
FIG. 9 presents a front elevation view of a pipe transporter deployed in a pipe (shown in cross-section), the pipe transporter comprising a set of pipe transporter traction wheels in accordance with the first embodiment of the present disclosure.

Referring initially to FIGS. 1-9, a pipe transporter traction wheel 100 is illustrated in accordance with an exemplary embodiment of the present disclosure. As shown in FIGS. 3 and 4, in some embodiments, the pipe transporter traction wheel 100 may include a hub 120 and a tractor portion (traction portion) 104 on the hub 120. As illustrated in FIG. 9, in typical application of the pipe transporter traction wheel 100, which will be hereinafter further described, a pair of the pipe transporter traction wheels 100 may be placed along wheel central axis 102 on each of a pair or triplet (trio) of transporter axles 142 (one of which is illustrated) of a pipe transporter 140. The pipe transporter 140 may be deployed in a pipe 136 such as an underground utility pipe, for example and without limitation, typically to inspect the structural integrity of the pipe 136 or as remotely operated means of curing relining sleeves or reinstating lateral connections post-relining. Each pipe transporter traction wheel 100 may engage an interior surface 138 of the pipe 136 as a transporter motor 143 on the pipe transporter 140 typically drives the transporter axle 142 and the pipe transporter traction wheels 100 traverse the interior surface 138 of the pipe 136 along the length of the pipe 136.

As illustrated in FIGS. 1 and 2, the tractor portion 104 of the pipe transporter traction wheel 100 may have a rear wheel surface 112 and a front wheel surface 114. One or more multiple tractor sections (traction section) 106 may extend from the rear wheel surface 112 to the front wheel surface 114. For instance, a tractor surface (traction surface) 105 can be defined by plurality of tractor sections 106 can be provided, wherein the tractor sections 106 are discretely arranged or spaced apart from one another around the circumference of the tractor portion 104. Valleys or gaps 108 may separate the tractor sections 106 from each other. In alternative embodiments of the disclosure, there may be no gaps between adjacent tractor sections 106 instead, there may be a single, tractor section or surface extending along the entire perimeter of the wheel.

Figure 6:
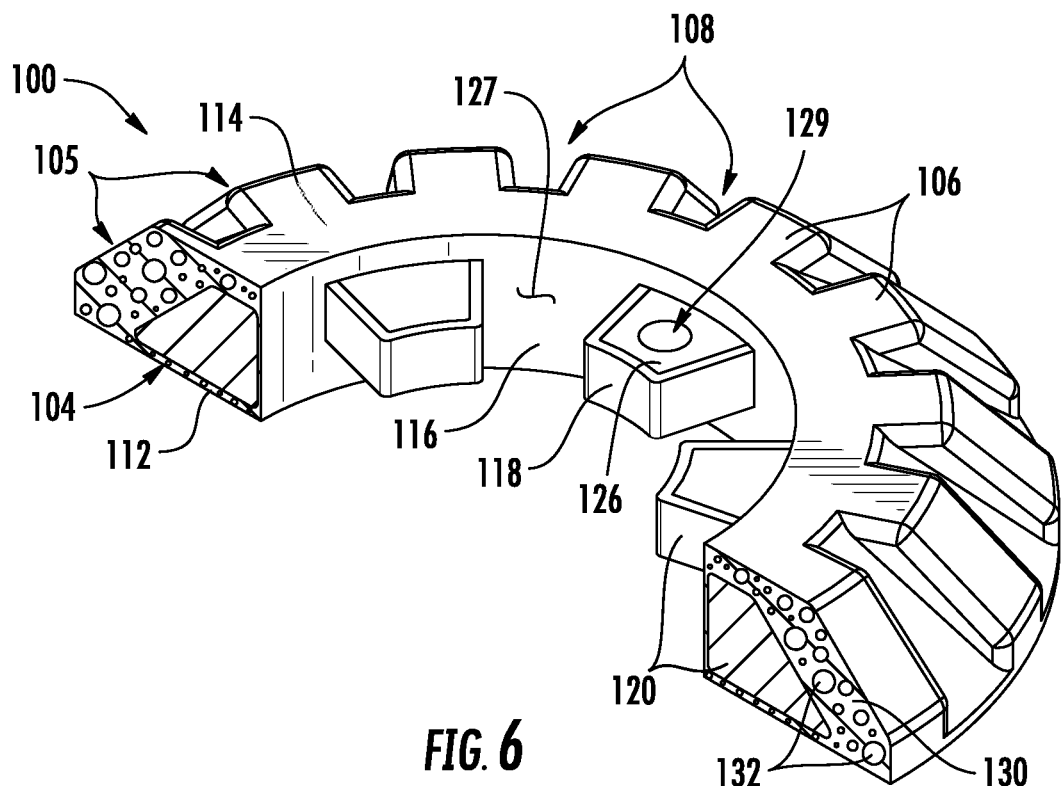
FIG. 6 presents a cross-sectional perspective view of the first embodiment of the pipe transporter traction wheel of the present disclosure.

As illustrated in FIGS. 6-8, the tractor portion 104 may include a matrix material 130 and a small-particle or granular material 132 which is encased or embedded in the matrix material 130. The granular material 132 is harder than the matrix material 130. In some embodiments, the matrix material 130 may include a thermoplastic elastomer, rubber, open cast urethane, epoxy, curable gel, putty and/or any other substance that can position or hold the harder, granular material in place in the tractor portion. The granular material 132 may include carbide grit, steel wool, various aggregates (e.g. crushed stone such as granite or quartz), diamond or other variations of carbon, silicates, and the like. The granular material 132 may be randomly or orderly placed in the matrix material 130. The granular material 132 may have random or non-random shapes, and may be rounded, or preferably, faceted. The harder, granular material 132 may impart traction of the tractor portion 104 against the interior surface 138 of the pipe 136, whereas the softer, matrix material 132 may reduce a scratching effect of the granular material 132 against the interior surface 138 of the pipe 136 and thus protect the pipe 136.

As shown in FIG. 3, a central wheel opening 110 may extend through the tractor portion 104. An interior wheel surface 116 may be circumferentially oriented around axis 102 and may face the wheel opening 110. In some embodiments, multiple wheel connecting portion skins 118 may extend from the interior wheel surface 116 into the wheel opening 110. A mounting interface 115 is defined by axially central portions of the tractor portion 104 and/or the hub 120 for at least assisting in connecting wheel 100 to axle 142, as discussed below.

As mentioned heretofore, the tractor portion 104 may include one or more tread or tractor sections 106 arranged about its circumference. The tractor section(s) 106 may be continuously or discretely arranged about the circumference of the pipe transporter traction wheel 100. For instance, two or more tractor sections 106 can be arranged discretely (i.e. spaced apart from one another) about the circumference of the pipe transporter traction wheel 100 at positions in which they impart high frictional contact with the interior of the pipe 136 (FIG. 9). This arrangement may facilitate predictable movement of the pipe transporter 140 as it traverses the pipe 136.

The tractor portion 104 may be attached to the hub 120 using any suitable attachment mechanism or technique known by those skilled in the art. In some embodiments, the tractor portion 104 may be detachably attached to the hub 120 such as by using male or female threaded features or mechanisms, quarter-turn locking mechanism or snap-on features (not illustrated). In other embodiments, the tractor portion 104 can be fixedly attached to the hub 120 such as by injection molding the tractor portion 104 onto the hub 120, for example and without limitation. Accordingly, the hub 120 may have a melt temperature which is well above the maximum process temperature needed for subsequent formation of the tractor portion 104.

The hub 120 of the pipe transporter traction wheel 100 may be fabricated by molding, machining and/or other fabrication techniques known by those skilled in the art. As illustrated in FIGS. 3 and 4, the hub 120 may include a hub rim 122. A central hub opening 124 may extend through the hub 120. Multiple, spaced-apart wheel connecting portions 126 (i.e., lobes) may extend from the hub rim 122 into the hub opening 124 for connecting the hub 120 to a wheel axle (see FIGS. 16-19 below for examples of adapters). As illustrated, six wheel connecting portions 126 are provided spaced circumferentially around the axis 102 and the hub opening 124, alternatingly spaced with gaps 127. Openings 129 may be provided through one or more of the wheel connecting portions 126 to facilitate attachment of the wheel 100 to the axle 142 of the pipe transporter 140 (see FIG. 9), either directly, via an element attached to the axle, and/or via an adapter of some sort (see FIGS. 16-19).

In connecting the tractor portion 104 to the hub 120, the wheel connecting portion skins 118 in the wheel opening 110 of the tractor portion 104 may be formed onto and interface with the respective wheel connecting portions 126 in the hub opening 124 of the hub 120 as the tractor portion 104 is typically molded to the hub 120. In some embodiments, the hub 120 may have various surface features to facilitate mechanical interlocking between the tractor portion 104 and the hub 120. As will be hereinafter described, the surface features may include dovetail hub flanges, notches and/or openings and the like.

Figure 5:
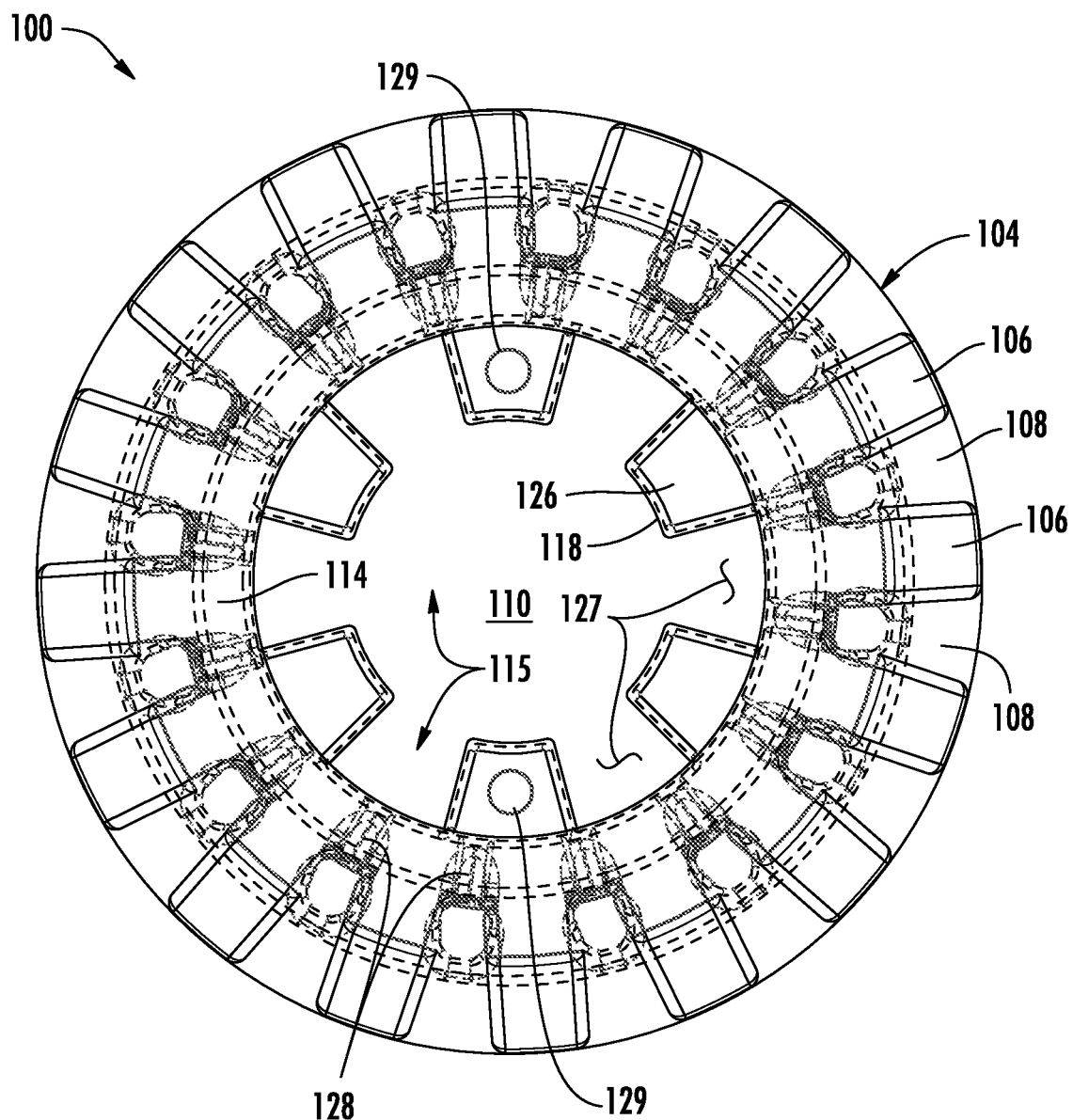
FIG. 5 presents a front view of the first embodiment of the pipe transporter traction wheel of the present disclosure.

In the event that the pipe transporter traction wheel 100 is fabricated by molding the tractor portion 104 to the hub 120, the injection points through which the tractor portion 104 is injected into a mold (not shown) may be specifically arranged to favor the formation of the tractor sections 106 of the tractor portion 104. More particularly, as illustrated in FIGS. 5 and 8, multiple groove-shaped injection points 128 may be formed as orifices extending through the hub 120 located interstitially (and angularly relative to a center of the wheel 100) between respective adjacent tractor sections 106 on the tractor portion 104. Polyurethane or other material (not illustrated) which is used to fabricate the tractor portion 104 may be injected through the injection points 128 to mold the tractor portion 104 onto the hub 120. The injection points 128 may improve the focused distribution of the harder, granular material 132 in the softer, matrix material 130 of the traction sections 106 in the molding process. As illustrated in FIG. 8, in some embodiments, the density of granular material 132 may be lower in the area of the injection points 128 than in the tractor sections 106.

As illustrated in FIG. 9, in typical application, multiple pipe transporter traction wheels 100 may be installed on a pipe transporter 140 which is deployed in a pipe 136 (shown in cross-section). Accordingly, a pair of pipe transporter traction wheels 100 may be mounted on each of a pair or trio of transporter axles 142 of the pipe transporter 140. This may be accomplished by mounting the hub 120 (FIGS. 3 and 4) of each pipe transporter traction wheel 100 by attaching the wheel connecting portions 126 of the corresponding hub 120 to the corresponding end of the transporter axle 142 via a hub adapter, screws or other fastening means. A transporter motor 143 may drivingly engage the transporter axles 142 as is known by those skilled in the art. The pipe transporter 140 may have a conventional design and may be fitted with equipment (not illustrated) such as video equipment, for example and without limitation, which may facilitate inspection of the pipe 136 for the presence of cracks and other anomalies, or other equipment for relining or cutting pipes, or other purposes. The pipe transporter 140 may traverse the length of the pipe 136 as the traction sections 106 on the tractor portion 104 of each pipe transporter traction wheel 100 engage the interior surface of the pipe 136. It will be appreciated by those skilled in the art that the granular material 132 in the tractor sections 106 of the tractor portion 104 imparts traction of the pipe transporter traction wheel 100 against the interior surface of the pipe 136, whereas the matrix material 130 protects the pipe 136 and provides the security of the granular materials to the body of the wheel, i.e. the matrix material provides a suitable medium to achieve the desired shape, size and interfaces necessary for the product.

Figure 10:
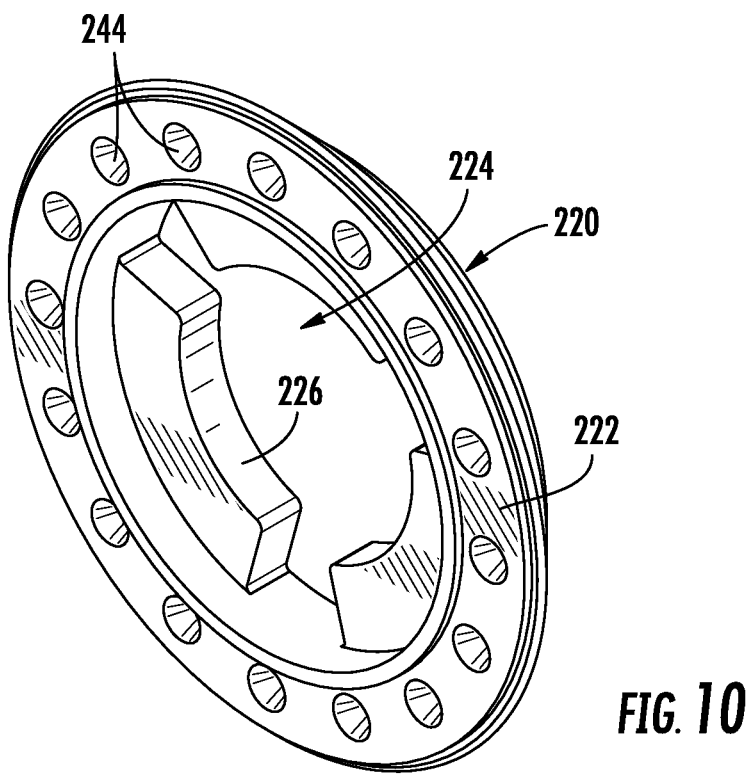
FIG. 10 is a top rear perspective view of a hub of a second embodiment of the pipe transporter traction wheel of the present disclosure.
Figure 11:
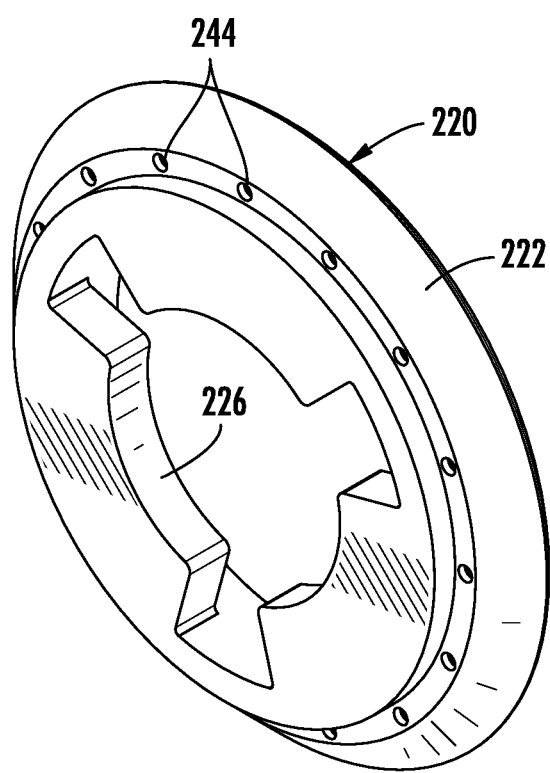
FIG. 11 is a top front perspective view of the hub of the second embodiment of the pipe transporter traction wheel of the present disclosure.

Referring next to FIGS. 10 and 11, a hub 220 of a second embodiment of the pipe transporter traction wheel of the present disclosure is illustrated. The hub 220 may include a hub rim 222 and a hub opening 224 with lobes 226. A plurality of counterbore openings 244 may extend through the hub rim 222. The tractor portion of the second embodiment of the pipe transporter traction wheel may have a design and composition which are the same as or similar to those of the tractor portion 104 (FIGS. 1-4) of the pipe transporter traction wheel 100 heretofore described in FIGS. 1-9. Accordingly, during injection molding of the tractor portion to the hub 220 of the pipe transporter traction wheel, polyurethane may extend through, and become solidified and cured through the counterbore openings 244, forming a mechanical attachment or interlock between the tractor portion and the hub 220. The counterbore openings 244 may thus contribute to obtaining a stronger pipe transporter traction wheel.

Figure 12:
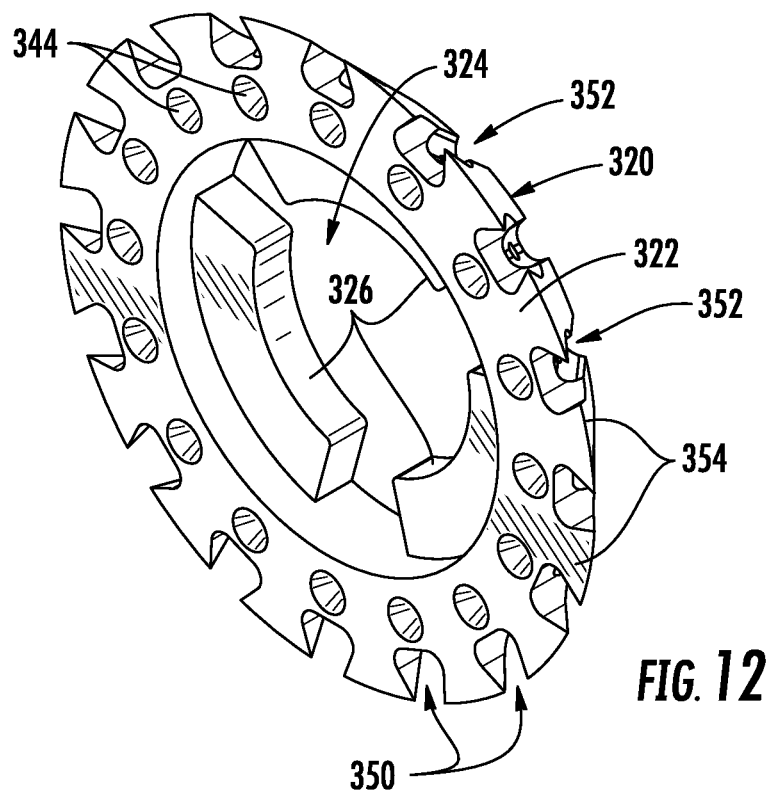
FIG. 12 is a top rear perspective view of a hub of a third embodiment of the pipe transporter traction wheel of the present disclosure.
Figure 13:
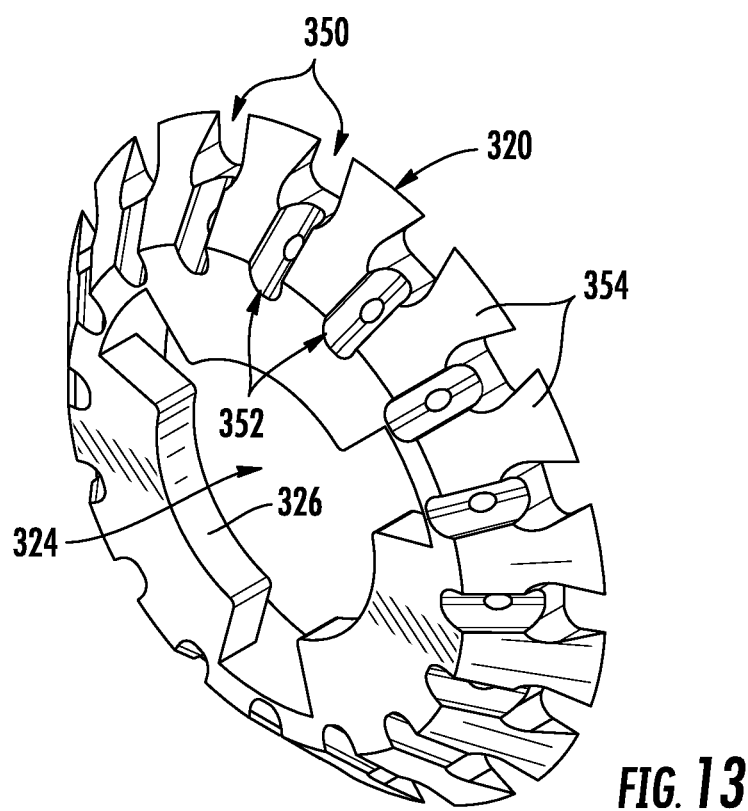
FIG. 13 is a top front perspective view of the hub of the third embodiment of the pipe transporter traction wheel of the present disclosure.

Referring next to FIGS. 12 and 13, a hub 320 of a third embodiment of the pipe transporter traction wheel of the present disclosure is illustrated. The hub 320 may include a hub rim 322 and a hub opening 324 with lobes 326. A plurality of counterbore openings 344 may extend through the hub rim 322. A plurality of front hub notches 352 and a plurality of rear hub notches 350 may extend through the hub rim 322 at the plurality of counterbore openings 344, respectively, forming a plurality of dovetail hub flanges 354. The tractor portion of the third embodiment of the pipe transporter traction wheel may have a design and composition which are the same as or similar to those of the tractor portion 104 (FIGS. 1-4) of the pipe transporter traction wheel 100 heretofore described in FIGS. 1-9. Accordingly, during injection molding of the tractor portion to the hub 320 of the pipe transporter traction wheel, polyurethane may pass through the counterbore openings 344, the front hub notches 352 and the rear hub notches 350 to form a mechanical interlock between the hub 320 and the polyurethane of the tractor portion.

Figure 14:
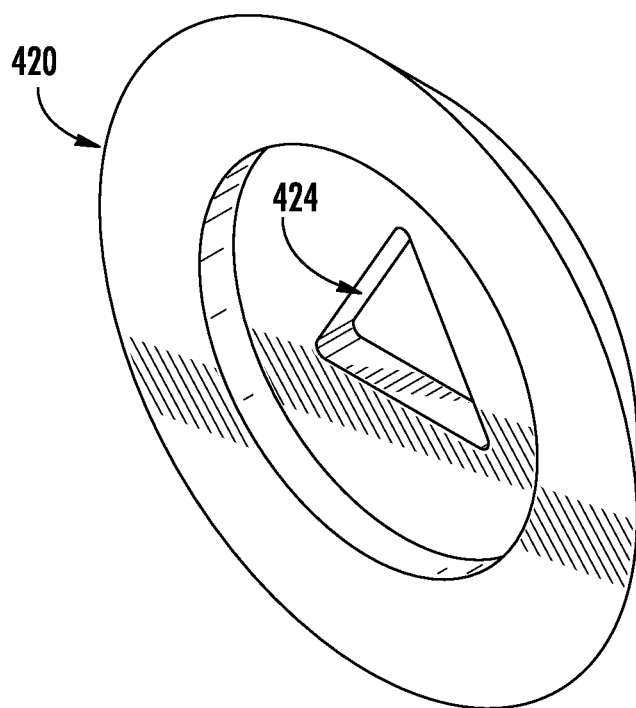
FIG. 14 is a top rear perspective view of a hub of a fourth embodiment of the pipe transporter traction wheel of the present disclosure.
Figure 15:
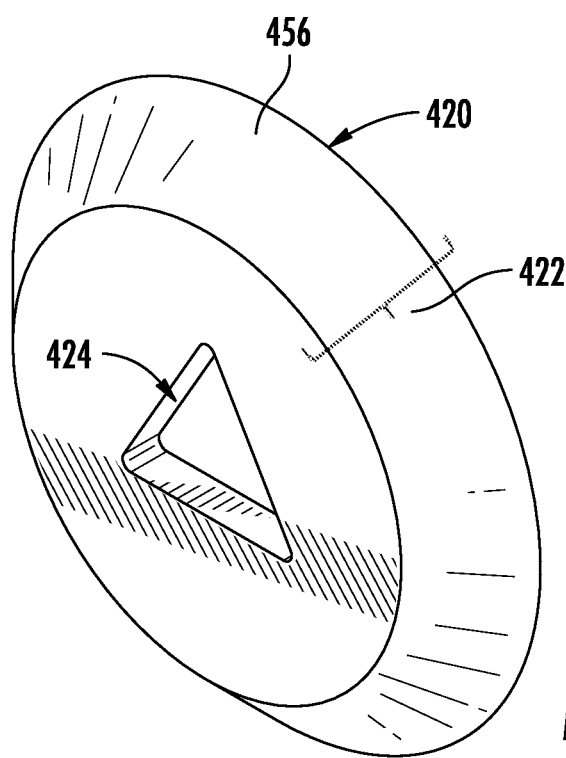
FIG. 15 is a top front perspective view of the hub of the fourth embodiment of the pipe transporter traction wheel of the present disclosure.

Referring next to FIGS. 14 and 15, a hub 420 of a fourth embodiment of the pipe transporter traction wheel of the present disclosure is illustrated. The hub 420 may include a hub rim 422 and a hub opening 424. A hub bonding surface 456 may be provided on the hub rim 422. The hub bonding surface 456 may facilitate chemical bonding of the hub 420 to the tractor portion in fabrication of the pipe transporter traction wheel. Alternatively or additionally, adhesive materials or mechanical fasteners (e.g. screws, snap-lock fasteners) and/or other features known by those skilled in the art may be used to attach the tractor portion to the hub 420, both in the present embodiment and in previous embodiments. The tractor portion of the fourth embodiment of the pipe transporter traction wheel may have a design and composition which are the same as or similar to those of the tractor portion 104 (FIGS. 1-4) of the pipe transporter traction wheel 100 heretofore described in FIGS. 1-9.

Figure 16:
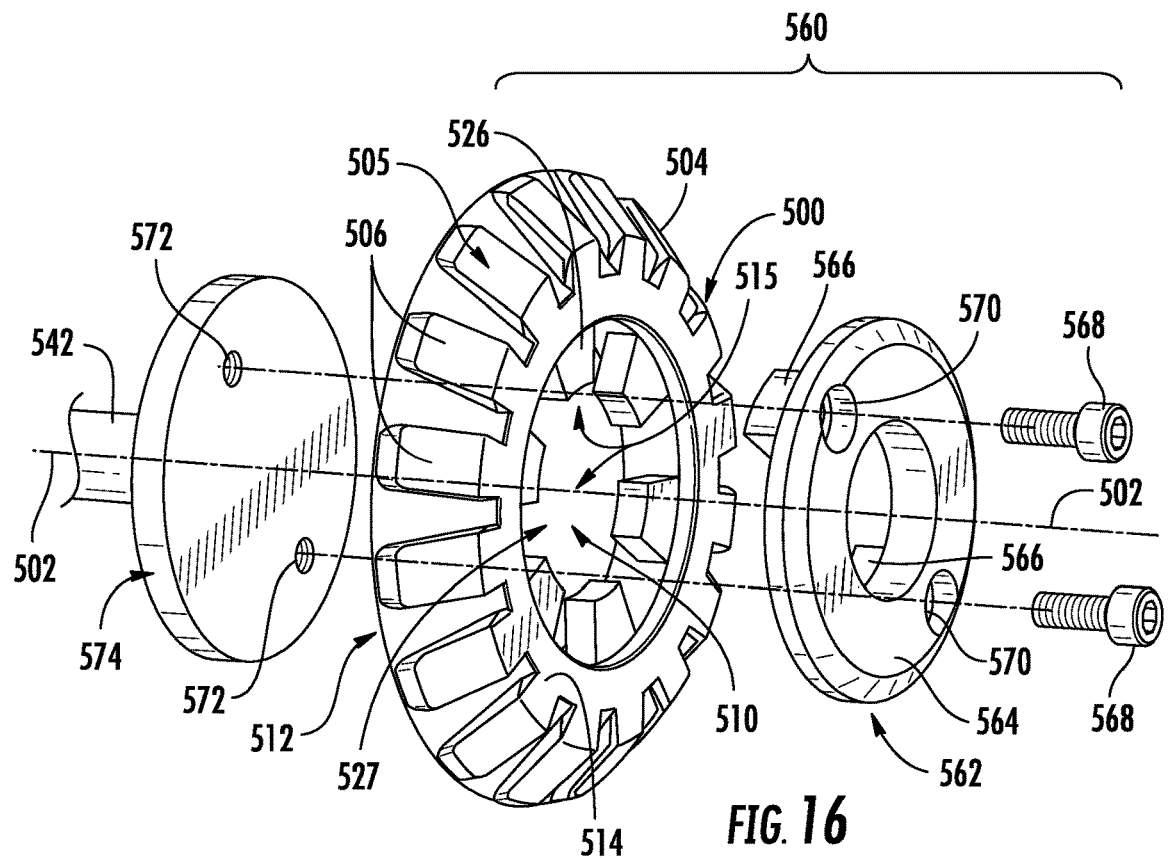
FIG. 16 is a side perspective view of a first example of a replacement wheel kit including an adapter of the present disclosure.

FIG. 16 shows a first example of a kit 560 for a pipe transporter traction wheel (e.g., wheel 100 or others disclosed and described herein) suitable for mounting on an axle 542 of a pipe transporter travelable along an interior surface of a pipe (See FIG. 9). It should be understood that kit 560 is one example for attachment of a wheel according to certain aspects of the present disclosure to an axle of a pipe transporter vehicle. Many existing vehicles, axles, and wheels have different designs, and certain axles have their own adapters or shaped ends for connection to a wheel. The mounting interface of the wheels disclosed herein, particularly with multiple radially-inward extending lobes (wheel connection portions 126), provide a modular multi-functional attachment allowing wheels (e.g. wheels 100) to be used with pipe transporters of differing designs.

Returning to FIG. 16, illustrated is a pipe transporter traction wheel 500 including a tractor portion 504 arranged around the central axis 502. The tractor surface 505 as illustrated includes the tractor sections 506 configured to contact the interior surface of a pipe when the pipe transporter is driven in the pipe (see FIG. 9), although the tractor surface could be one continuous surface, as mentioned above.

A mounting interface 515 is located generally around the central axis 502 of the tractor portion 504. The mounting interface 515 is configured for attachment of the pipe transporter traction wheel 500 to the axle 542. The mounting interface 515 includes an opening 510 between a rear wheel surface 512 and a front wheel surface 514 of the tractor portion 504. As shown, a mounting interface 515 includes a plurality of lobes 526 that extend radially inward toward the central axis 502. Six lobes 526 are shown, separated by six gaps 527. As shown, shown each lobe 526 and gap 527 has a substantially equal circumferential extent (about 30 degrees). However, lobes 526 and/or gaps 527 may differ in extent and/or placement, symmetrically, partially symmetrically, or non-symmetrically. Also, although six lobes 526 and gaps 527 are depicted, but the amount of either or both could be different.

An adapter 562 is configured to cooperatively assist with attachment of the pipe transporter traction wheel 500 to the axle 542. The depicted adapter 562 is but one example of a structure useful for attaching wheel 500 to a particular type of pipe transporter. Thus, as will be discussed below, providing one or more adapters and a traction wheel in a kit allows use of the traction wheel with more than one design of pipe transporter. An efficient modularity is thus achieved wherein a single wheel design may be used with pipe transporters of differing designs and/or made by different OEM's by choosing a matching adapter.

As illustrated, the mounting interface 515 of the wheel 500 has six lobes 526 and six gaps 527 arranged alternatingly and spaced equidistantly around the central axis 502. The adapter 562 includes a main body 564 which in this case is annular, although it could be a disc or other regular or irregular shape suitable for attachment to wheel 500 and axle 542. The adapter 562 includes at least one structure 566 extending axially into a respective gap 527 when the adapter 562 is attached to the mounting interface 515 of the wheel 500. As shown, two such structures 566 are provided, spaced 180 degrees from each other around the central axis 502. Each such structure 566 is generally shaped as a truncated wedge, complimentary to the shape of the respective gap 527 into which the structure 566 is placed. Fastening members 568 extend through holes 570 in the structures 566 in the adapter 562 to attach the adapter 562 and the wheel 500 to the axle 542 via threaded holes 572 on a connecting structure such as a flange or other connector 574 attached to the axle 542. As shown, the flange 574 includes two of the holes 572 spaced apart 180 degrees around axis 502, so the two holes 570 in the adapter 562 and two fasteners 568 are selected and located accordingly.

Variations to that which is illustrated are possible. For example, other numbers and locations of structures 566, fasteners 568, and holes 570 can be made, either because of the design of the flange 574 or for other reasons such as strength, stability, weight, costs, etc. Further, the adapter 562 can have more structures 566 and/or holes 570 than there are holes 572 in the axle flange 574 for modularity of use with other axle adapter designs. Also, adapter 562 can be modified so that the holes 570 are spaced from structures 566 and may instead align with holes (not shown) in modified lobes 526 and holes 572 in the flange 574. Further, although the fastening members 568 are illustrated as threaded machine screws, other structures could be used such as pins, clips, a nut and bolt, key and keyway, set screws, bolts fixed to extend from the axle flange 574, etc.

Figure 17:
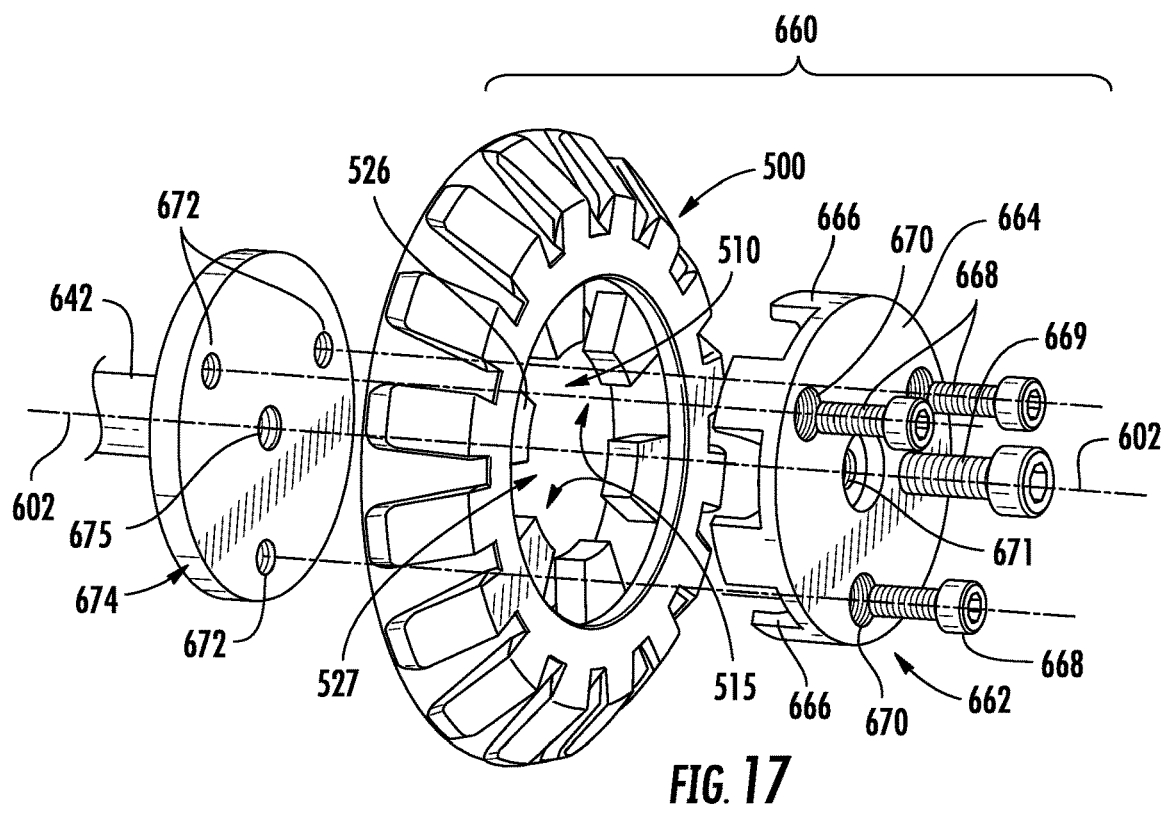
FIG. 17 is a side perspective view of a second example of a replacement wheel kit including an adapter of the present disclosure.

FIG. 17 shows an alternate kit 660 comprising a wheel 500 (as above) and an alternate adapter 662 mountable to axle 642 with axle flange 674. As shown, the body 664 of adapter 662 is disc-shaped, and has six structures 666 that fit in the gaps 527 in the wheel 500. Three fasteners 668 extend through three holes 670 spaced 120 degrees apart to connect with three threaded holes 672 in axle flange 674. A fourth fastening member 669 extends through a central hole 671 and extends into a threaded opening 675 in the end of the axle 642 along a central axis 602. Again, variations to that illustrated in FIG. 17 are possible in terms of number, location, and addition or deletion of elements.

Figure 18:
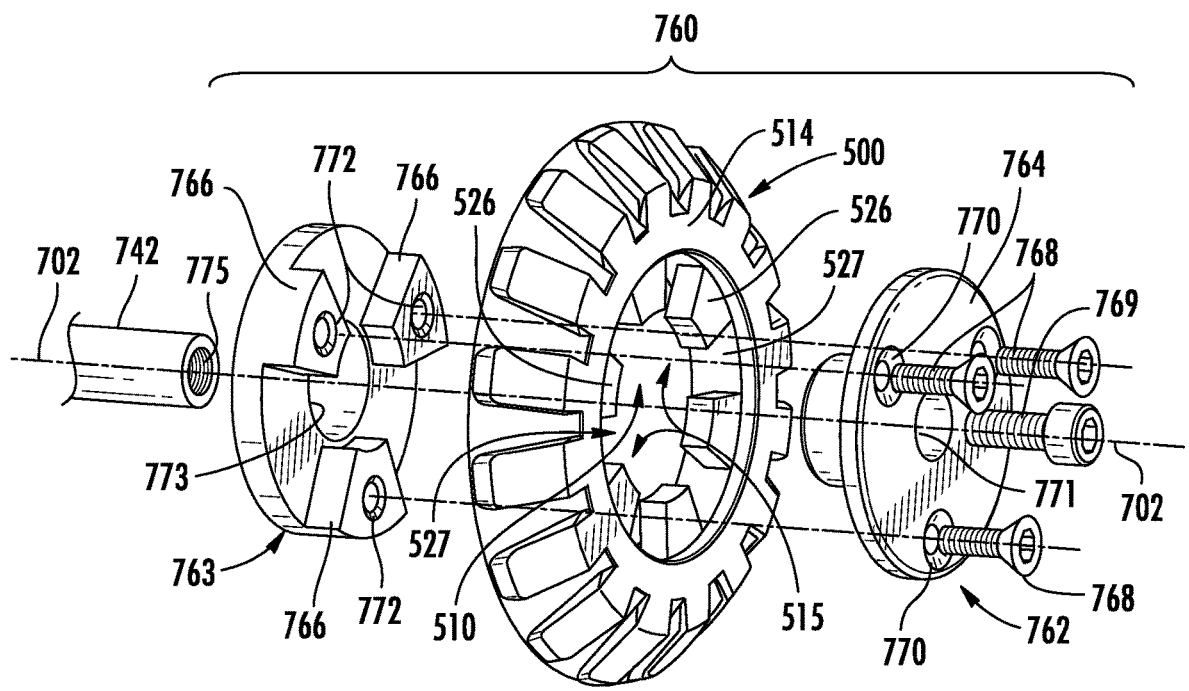
FIG. 18 is a side perspective view of a third example of a replacement wheel kit including an adapter of the present disclosure.
Figure 19:
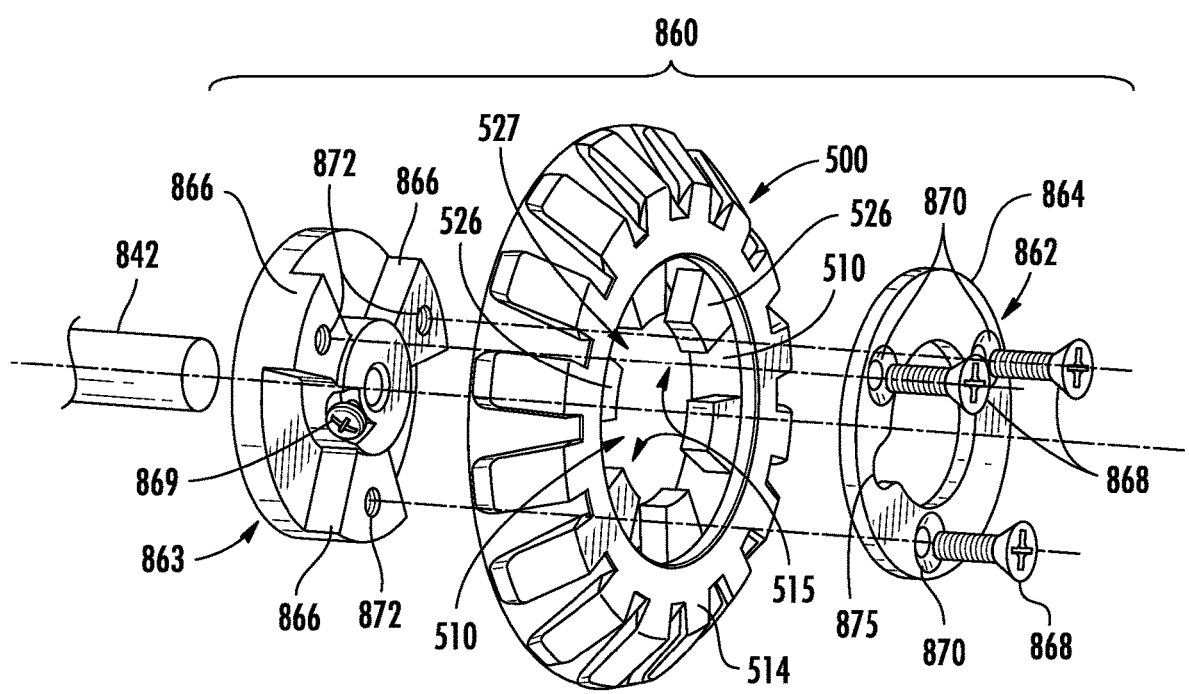
FIG. 19 is a side perspective view of a fourth example of a replacement wheel kit including an adapter of the present disclosure.

FIG. 18 shows an alternate kit 760 comprising a wheel and an adapter made of a first part 762 axially locatable adjacent the front wheel surface 514 and a second part 763 axially locatable adjacent the rear wheel surface 512 when the adapter is attached to the wheel. As shown, the first part 762 includes a plate-like body 764 with three holes 770 for three fasteners 768, and a fourth hole 771 for a fourth fastener 769. The second part 763 includes three structures 766 that are 120 degrees apart and that extend into gaps 527 in the wheel 500. The structures 766 also includes holes 772 for receiving fasteners 768 and a larger central hole 773 for receiving the fourth fastener 769 that threads into a hole 775 in axle 742 along a central axis 702. Again, modifications are possible, such as moving structures 766 to first part 762 and changing the length of fasteners 768, or changing the number or arrangement of certain parts FIG. 19 shows another embodiment of kit 860 having first and second adapter parts 862,863. The second part 863 includes three structures 866 with holes 872 alignable so as to correspond with locations of holes 870 in the first part 862. Three fasteners 868 can be placed through holes 870 and 872 to connect adapter parts 862,863 to wheel 500 with structures 866 in three of the gaps 527. A set screw 869 is used to hold second part 863 to axle 842, and a cut out 875 may be provided on the annular body 864 of the first part 862 to allow the user to access the set screw 869 from front wheel surface 514 without removing the first part 862. Again, variations in the above structures are possible.

Alternative embodiments are contemplated to those depicted herein. For instance, as mentioned heretofore, the tractor portion may include a single, tractor section or surface extending along the entire perimeter of the wheel. Alternatively or additionally, the pipe transporter traction wheel may not include a hub, i.e. the harder, granular material may be encased within the softer, matrix material without the inclusion of a hub.

With regard to the kits 560-860, differing portions of the parts disclosed therein can be mixed and matched to create further kits, providing even more flexibility for use with differing OEM or modified pipe transporters. Thus, circumferentially-located, axially-located, or set-screw type fasteners may be employed in various combinations to hold wheels to a given axle, in view of the wheel or its connected adapter requirements.

With regard to materials used in the various wheels disclosed herein, the hub portions may be made of 10% short fiber glass-filled Nylon 6 (i.e., 10% of the mass of the hub is glass fibers manufactured directly into the pelletized raw material). Nylon 6 is also known as polycaprolactam, a semicrystalline polyamide. However, its broader aspects other moldable or machinable materials with a melting temperature above 200° C. and tensile strength above ~40 MPa would be suitable. The glass filling beneficially decreases the shrink percentage of the molded hub and has the added benefit of dramatically increasing the strength of the molded hub.

The granular material within the matrix portion of the wheel may be made of 8 Mesh (approximately 2 mm to 2.5 mm) tungsten carbide grit. However, any relatively hard material that has edges/corners to enhance traction, also with a melt temperature above 200° C., could be used. The granular material could in fact be other aggregate (rock) product, crushed walnut shells, recycled glass beads, etc. The granular material 132 could also be made of manufactured shapes (e.g., star polygons, star polyhedrons, slivers, cubes, a shape similar to toy "jacks," etc.). It should be understood that although for representative illustration herein the granular material 132 is shown as spherical "bubbles," such is not necessarily representative of the actual shape of the granular material, such as those noted above with edges/corners.

The matrix material within the wheel may be made of Elastollan® (a BASF product; Grade C90A13 Thermoplastic Polyurethane (TPU) Elastomer). However, the matrix could be many different materials, whether within the urethane families (with TPU being one such family), rubber (natural, synthetic, or a blend), open cast materials (urethane being one option), or other materials that can be formed from a low-viscosity liquid state to a solid state, allowing it to surround and suspend the granular material.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalents.

What is claimed is:

1. A pipe transporter traction wheel suitable for mounting to an adapter on an axle of a pipe transporter travelable along an interior surface of a pipe, the adapter having structures extending axially, the pipe transporter traction wheel comprising:
   a hub;
   a traction portion overmolded onto the hub and configured to be attached with a mounting interface on the hub to a pipe transporter, the traction portion defining a central axis;
   a traction surface on the traction portion configured to contact an interior surface of a pipe when the pipe transporter is driven in the pipe, the traction surface extending around a circumference of the traction portion around the central axis, and the traction portion including a plurality of traction sections spaced apart from one another around the circumference of the traction portion and separated by first gaps, each of the traction sections including a part of the traction surface; and
   the mounting interface located generally around the central axis of the traction portion, the mounting interface being configured for attachment of the pipe transporter traction wheel to the pipe transporter, the mounting interface including an opening between a rear wheel surface and a front wheel surface of the traction portion, the mounting interface further including a plurality of lobes, the lobes extending radially inward toward the central axis and being separated by second gaps, the mounting interface including six of the lobes and six of the second gaps arranged alternatingly and spaced equidistantly around the central axis, the second gaps each being sized for receiving respective ones of the structures extending axially from the adapter for fastening the mounting interface to the axle of the pipe transporter.

2. The pipe transporter traction wheel of claim 1, wherein the traction portion includes a granular material and a matrix material embedding the granular material, the granular material having a hardness higher than a hardness of the matrix material.

3. The pipe transporter traction wheel of claim 2, wherein a density of the granular material throughout the traction portion is not uniform.

4. The pipe transporter traction wheel of claim 3, wherein the density is higher nearer the traction surface than at other locations within the traction portion.

5. The pipe transporter traction wheel of claim 4, wherein the density is lower nearer the first gaps than at other locations within the traction portion.

6. A kit for a pipe transporter traction wheel suitable for mounting on an axle of a pipe transporter travelable along an interior surface of a pipe, the kit comprising:
   a pipe transporter traction wheel including:
      a hub;
      a traction portion overmolded onto the hub and defining a central axis, the traction portion having a traction surface configured to contact an interior surface of a pipe when the pipe transporter is driven in the pipe; and
      a mounting interface on the hub located generally around the central axis of the traction portion, the mounting interface being configured for attachment of the pipe transporter traction wheel to the axle, the mounting interface including an opening between a rear wheel surface and a front wheel surface of the traction portion, the mounting interface further including a plurality of lobes, the lobes extending radially inward toward the central axis and being separated by gaps, the mounting interface including six of the lobes and six of the gaps arranged alternatingly and spaced equidistantly around the central axis; and
   an adapter configured for cooperatively assisting in attachment of the pipe transporter traction wheel to the axle, the adapter including structures extending axially into the gaps when the adapter is attached to the mounting interface.

7. The kit of claim 6, wherein the adapter includes a first part axially locatable adjacent the front wheel surface and a second part axially locatable adjacent the rear wheel surface when the adapter is attached to the mounting interface.

8. The kit of claim 7, wherein at least one of the first part and the second part includes the structures extending axially into the gaps when the adapter is attached to the mounting interface.

9. The kit of claim 6, wherein the mounting interface includes structures arranged to receive either two or three screws equidistantly spaced circumferentially around the axis.

10. The kit of claim 6, wherein the traction portion includes a granular material and a matrix material embedding the granular material, the granular material having a hardness higher than a hardness of the matrix material.

11. The kit of claim 6, wherein the traction surface extends around a circumference of the traction portion around the central axis, and the traction portion includes a plurality of traction sections spaced apart from one another around the circumference of the traction portion and separated by gaps, each of the traction sections including a part of the traction surface.

12. The kit of claim 6, wherein the axle includes a flange, the adapter contacting the flange when attaching the wheel to the axle.

13. The kit of claim 12, wherein the adapter defines axially-extending holes therethrough alignable with holes defined in the flange for receiving fasteners.

14. The kit of claim 13, wherein the holes in the adapter extend through the structures.

15. The kit of claim 6, wherein the adapter defines a central hole through which a fastener extends, the fastener extending into a threaded opening in the axle.

16. The kit of claim 7, wherein the first part and the second part each define holes therethrough, at least one of the holes in the first part being alignable with at least one of the holes in the second part for receiving fasteners therethrough to fasten the first part to the second part.

17. The kit of claim 16, wherein at least one of the alignable holes in the first part or the second part of the adapter extends through the structures.

18. The kit of claim 6, wherein the adapter defines a radially-extending opening, the kit further including a set screw in the radially-extending opening for attaching the adapter to the axle.

19. The kit of claim 6, wherein the adapter includes one of two, three, or six of the structures.

\* \* \* \* \*